US006637976B2

(12) United States Patent
Stanton (10) Patent No.: US 6,637,976 B2
(45) Date of Patent: Oct. 28, 2003

(54) UNDERGROUND STORAGE VAULT (75) Inventor: Kelly Stanton, Schenectady, NY (US)

(73) Assignee: Guardian Containment Corp., Schenectady, NY (US)

( * ) Notice: Subject to any disclaimer, the term of this patent is extended or adjusted under 35 U.S.C. 154(b) by 0 days.

(21) Appl. No.: 10/054,500

(22) Filed: Jan. 22, 2002

(65) Prior Publication Data

US 2002/0064425 A1 May 30, 2002

Related U.S. Application Data (63) Continuation-in-part of application No. 09/132,418, filed on Aug. 11, 1998, now Pat. No. 6,340,269.

(51) Int. Cl.[7] .............................................. B65G 5/00
(52) U.S. Cl. ...................................... 405/53; 220/567.2
(58) Field of Search ............................ 405/52, 53, 54, 405/55; 220/567.1, 567.2

(56) References Cited

U.S. PATENT DOCUMENTS

| | | | | |
|---|---|---|---|---|
| 2,824,431 A | * | 2/1958 | Pearson | 220/592.12 |
| 2,824,432 A | * | 2/1958 | Varese et al. | 220/592.12 |
| 4,911,326 A | * | 3/1990 | McGouran, Jr. | 220/567.2 |
| 5,071,166 A | * | 12/1991 | Marino | 220/560.03 |
| 5,454,205 A | * | 10/1995 | Bol | 405/53 |
| 5,778,608 A | * | 7/1998 | Elliott, Jr. | 405/53 |
| 5,800,143 A | * | 9/1998 | Bravo | 405/52 |
| 5,881,760 A | * | 3/1999 | Del Zotto | 137/264 |
| 5,884,709 A | * | 3/1999 | Evans et al. | 220/567.2 |
| 5,893,479 A | * | 4/1999 | Berberat | 220/567.2 |
| 6,196,761 B1 | * | 3/2001 | Stanton et al. | 405/53 |
| 6,340,269 B1 | * | 1/2002 | Stanton et al. | 405/53 |

* cited by examiner

Primary Examiner—Heather Shackelford
Assistant Examiner—Frederick L. Lagman
(74) Attorney, Agent, or Firm—DL Tschida

(57) ABSTRACT

A below-grade, modular cast concrete containment vault which contains one or more primary liquid storage tanks. Dispensing pumps and sundry conduits and support equipment are attached to or supported within a cast concrete base cover or a conduit and equipment chase and chase covers. The base cover or chase is supported on the vault base. The pumps can be coupled to a remote control and communications kiosk. A manhole permits access to a ventilated secondary containment and inspection space within a vault base. A remote fill base and a sealed conduit contain liquid and vent piping and couple to the chase. Spill and overflow containment assemblies surround fill and vent pipes in the vault base cover, chase cover and remote base and direct spillage to the secondary storage space. Tertiary and auxiliary containment is also provided for containing leakage and spillage and backup storage for the overflow containment assemblies.

20 Claims, 9 Drawing Sheets

UNDERGROUND STORAGE VAULT

RELATED APPLICATIONS

This is a continuation-in-part of application Ser. No. 09/132,418, filed Aug. 11, 1998 now U.S. Pat. No. 6,340,269.

BACKGROUND OF THE INVENTION

The present invention relates to fuel storage vaults and, in particular, to a ventilated, below-grade, multi-section cast concrete containment vault that contains one or more primary liquid storage tanks. An open-bottom cast concrete conduit and equipment chase at the vault cover and a reinforced conduit chase from a remote fill sump contain all liquid conduits and dispenser accessories. Access to the vault and accessory is thereby facilitated and any liquid spillage or overflow is contained to secondary or tertiary storage spaces. Canopy columns are anchored to the cast cover.

A byproduct of society's increasing awareness to the environment and growing concerns toward ground water contamination and the adverse effects of spilled petrochemicals (e.g. oil, gasoline etc.) has been the institution of varieties of regulatory controls over related storage vessels. The controls are intended to promote safe fuel storage and contain spills. A primary goal is to avoid contaminated soils, such as are commonly found at the sites of gasoline stations, fueling depots and other fuel handling sites. The contamination can insidiously occur over time from small leaks or from a single large spill.

The fuel delivery industry has a separate desire for automatic, attendant free dispensing stations. The station should be compatible with all regulatory requirements and permit fuel delivery with either cash or credit card. Appurtenant storage tanks may either mount above or below grade and controls should be available to make the tanks substantially self-sufficient.

A variety of below-grade storage containers have been developed for containing pressurized and non-pressurized, flammable liquids, such as gasoline, propane or natural gas. Some of these containment vessels and tanks are shown at U.S. Pat. Nos. 1,958,487; 3,151,416; 3,995,472; 4,183,221; 4,607,522; and 4,653,312. The foregoing containers generally provide assemblies that include a primary metal containment chamber that is surrounded by a reinforcing material, such as concrete. Various arrangements of intervening layers of insulators and/or liquid impermeable materials are also included in the various tank assemblies.

Numerous above-grade storage vessels are also known. Most of these vessels provide only a tank assembly having a single skin or single layer of material, such as metal or concrete. Rupture or damage to the tank wall most typically results in an uncontrolled and uncontained spill. To avoid uncontained spills, some tanks are mounted behind a surrounding berm wall or dike.

In lieu of a dike, some tanks are constructed with a multi-layered construction that includes a primary tank surrounded by a concrete or metal structure. The primary tank may or may not be integrated into the surrounding structure. U.S. Pat. Nos. 2,083,491; 2,136,390; 2,777,295; and 4,513,550 disclose cast concrete containment chambers wherein the structural walls include liquid impermeable liners.

Still other above-grade storage vessels are disclosed at U.S. Pat. Nos. 2,544,828; 3,562,977; 4,366,654; 4,372,906; 4,552,166; 4,826,644; 4,911,326; 4,934,122; and 4,986,436. Several of the foregoing storage tanks provide a primary metal containment chamber that is surrounded by a monolithic cast concrete vault. One or more intervening membranes, impermeable to a contained liquid, are also provided to obtain secondary containment.

Another metal storage vessel having secondary containment is shown at U.S. Pat. No. 4,895,272. Also included in this tank is an assembly for directing spillage from the vent into a secondary storage space. U.S. Pat. No. 5,769,109 discloses a spill containment collar to direct spillage into the primary tank and/or a secondary storage space.

A principal deficiency above-grade storage containers is that the primary tank is exposed to a variety of physical dangers that can effect the life of the container. The sealed concrete tanks are also subject to potential cracking with thermal expansion and contraction; physical damage due to handling or collision from automobiles, trucks, onsite equipment or the like; and potential corrosion of reinforcement members within the concrete, such as from condensation that can form between the steel liner and surrounding concrete assembly. Damage to any one of the container components can require replacement of the entire assembly.

In preference to a monolithic assembly, a modular assembly permits selective replacement of one or more of the container components in the event of damage or normal wear and tear to the individual components. A modular construction is also more accommodating of conventional pre-cast manufacturing processes, such as are used to form open top septic tanks and detachable covers.

The containment vault of the present invention was developed to accommodate all enacted regulations, especially applications requiring storage of gasoline. A further purpose was to accommodate concerns of the user to cost and repair or replacement of portions of the containment system and to provide a system that lends itself to an attendant free, fuel dispensing station. The vault is constructed in the form of a pre-cast concrete housing that surrounds one or more internal storage tanks. The housing includes a base, a full-length conduit and equipment chase or collar and one or more covers. Vent and supply conduits, sundry accessories and sealed access conduits are pre-mounted to the chase. A remote fill basin and sealed, reinforced piping contains liquid supply and vent conduits and isolates and directs any overflow spillage or leakage to the containment spaces at the vault.

The vault is constructed to accommodate underground burial and support one or more fuel dispensers directly to the chase cover(s). Liquid containment pans are integrated into the chase cover(s), aligned to each dispenser and sealed from penetrating structures to collect liquid spillage. Manhole access and spill and rupture containment provisions are also provided.

SUMMARY OF THE INVENTION

It accordingly is a primary object of the invention to provide an environmentally friendly liquid containment vessel that can be mounted above or below-grade.

It is a further object of the invention to provide a vessel including a reinforced cast concrete base and a detachable cast concrete equipment and conduit chase and one or more chase covers.

It is a further object of the invention to provide a vessel including one or more primary liquid storage tanks that provide secondary and/or tertiary containment space to collect leakage and spills.

It is a further object of the invention to provide a vault or chase cover having a manhole access port and a ventilated base sized to permit internal examination for leakage at the primary tanks.

It is a further object of the invention to provide a cast concrete base that supports one or more primary storage tanks and wherein the cover includes sundry conduits, fixtures and accessories to support one or more liquid dispensers mounted to the cover.

It is a further object of the invention to provide a sump and one or more siphon assemblies that communicate with the interior space of the base to facilitate removal of condensation and the recovery of leaked or spilled liquids.

It is a further object of the invention to provide a raised spill containment collar, that surrounds fill, dispensing and or vent pipes that open to the primary storage tanks, to collect and direct any spillage to the primary tank, secondary storage space within the base or to an auxiliary or tertiary storage tank.

It is a further object of the invention to provide an equipment and conduit chase that mounts to the vault and has pre-mounted conduits and accessories and one or more sealed ports that couple with reinforced feeder conduits containing associated electrical conduits and liquid supply and vent lines.

It is a further object of the invention to provide a remote concrete fill base and a sealed, pipe-containing conduit that couples to conduits communicating with the sealed port(s) at the vault chase or collar.

Several of the foregoing objects, advantages and distinctions of the invention are obtained in several presently preferred vaults that provide an open-topped, reinforced cast concrete base and a separately cast, detachable conduit and equipment chase and/or one or more chase or vault cover(s). In one assembly, a vault cover includes a number of permanently mounted conduits and junction boxes and support platforms for one or more dispensing pumps. A manhole access port is separately provided which opens to the interior of the base. The cover is cast to support the weight of covering earth and vehicles that may pass over the cover.

Each dispenser support platform defines a spill containment collar that surrounds fill, dispensing and/or vent standpipes to collect spillage that may occur during filling or with liquid expansion. Conduits direct collected spillage to the secondary containment space within the base or to an auxiliary collection tank. Other standpipes permit monitoring the stored liquid and inspection of the secondary and tertiary containment spaces. The various standpipes can be incorporated into guard stanchions mounted about the dispensing pumps.

The base supports one or more primary liquid storage tanks, which are formed of steel or fiberglass. The base and cover may be lined with a thermal insulator. A sump region at a low point of the base and a siphon assembly are provided. The siphon assembly removes condensation, leakage or spillage. A liquid and vapor tight seal mounts between the base and cover. Separate resilient seals are cast into the cover or fitted to surround the various standpipes.

Air ventilation equipment and/or supply and exhaust ports are provided in the base and cover as necessary to facilitate internal inspection, maintenance and spill collection. Fans circulate and discharge air from the base during inspection.

In other vault assemblies, a rectangular, raised cast concrete conduit and equipment chase or collar contains pre-mounted piping, conduits and accessory equipment and mounts to the vault base. Access to the vault is obtained through several lids or covers mounted to the chase.

The vault and/or chase covers anchor canopy columns and include sealed pans that mount beneath the liquid dispensers to catch and direct spillage or leakage to the containment spaces of the vault.

Still other objects, advantages and distinctions of the invention will become more apparent upon reference to the following detailed description with respect to the appended drawings. Similar components and assemblies shown at the various drawings are referred to with similar alphanumeric reference characters. To the extent various modifications and improvements have been considered, they are described as appropriate.

DESCRIPTION OF THE PREFERRED EMBODIMENTS

Figure 1:
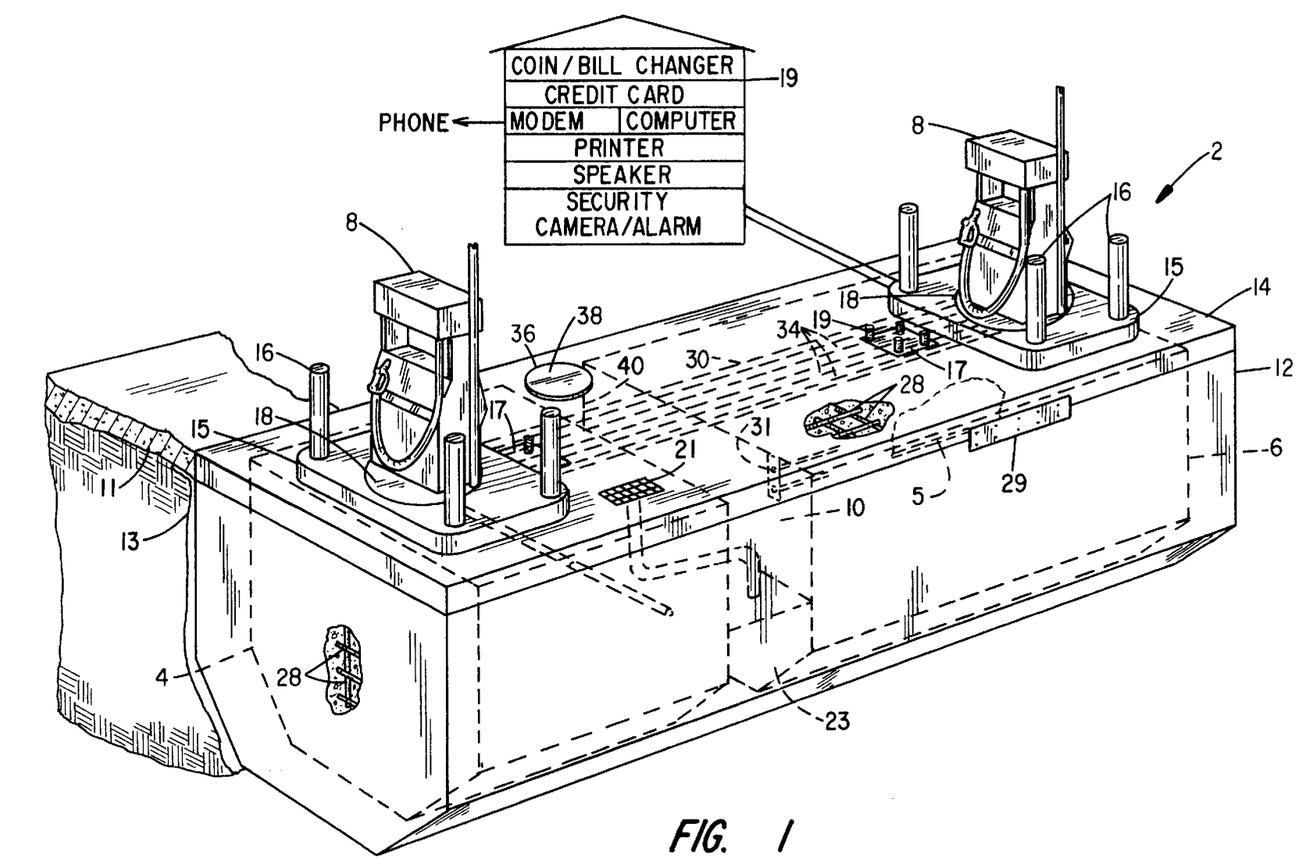
FIG. 1 is a perspective drawing to a ventilated vault mounted in a below grade setting which supports two primary liquid storage tanks of differing sizes and two pump dispensers that communicate with a control kiosk.

Referring to FIG. 1, a perspective drawing is shown to a multi-section, liquid storage container or vault 2. The vault 2 contains a pair of primary liquid containment tanks 4 and 6 and supports a pair of dispensing pumps 8. The size of the tanks 4 and 6 can be the same or different and can be constructed to various shapes, for example, cylindrical, square, rectangular or other compound shapes.

Secondary containment of leaks, spills or condensation is obtained at a cavity space 10 within a cast concrete base 12 that surrounds the tanks 4 and 6. The pumps 8 are secured to a detachable cover 14. Each pump 8 is secured to a concrete support pad 15 that is surrounded by a number of vertical stanchions 16. The stanchions 16 principally protect the pumps 8, although can contain standpipes or ports that communicate with the tanks 4 and 6 or vault 2, such as for venting, inspecting and or monitoring the vault 2. The pads 15 can be cast with the cover 14 or can be mounted to a containment collar 18 and/or mounting plate 60, reference FIG. 3, associated with each pump 8. Anchor plates or supports 17 with fasteners 19 for an awning or other conventional weather cover (not shown) can also be mounted to the cover 14 to span one or multiple vaults 2 and shelter users and their vehicles.

The vault 2 is constructed to mount below-grade, although could be mounted above-grade. Most typically, the vault 2 is buried to a defined grade in a prepared soil. The exterior of the vault 2 is covered with a suitable sealant such as an epoxy or paint. A liquid impermeable liner 13 can be included in the burial hole prior to setting the vault 2. A cover material 11, such as asphalt, gravel or concrete, is deposited over the soil. The material 11 can either abut the cover 14 or a skim coat of suitable thickness can partially cover the cover 14.

The primary storage tanks 4 and 6 can be constructed of metal or fiberglass. The capacity of the tanks 4 and 6 can be sized as desired. Typically the tanks 4 and 6 are selected and sized to contain different grades of fuel. With the selection of a particular blend of fuel at a dispenser pump 8, associated mixing equipment mounted within the pump 8 or vault 2 draws and dispenses appropriate concentrations of the selected liquid.

The vault 2 finds particular application in the setting of a gasoline pumping or service station. With relatively little site preparation, the vault 2 can be set below grade, plumbed and wired to provide an attendant free dispensing facility. In such an instance, a weatherproof, on site shelter or kiosk 19 typically contains appurtenant control and communication equipment regarding user selections and payment. For example, the kiosk 19 might contain, coin and bill accepting and change making equipment, credit card verification equipment, phone lines, modems, a programmed computer, printer, speakers and site security equipment. The foregoing controls might also be divided amongst multiple kiosks 19 and/or portions of the control may be provided directly at the pumps 8, such as credit card readers. The vault 2 may also be used in a conventional service and/or fuel station setting where an attendant is present to facilitate fuel delivery and payment. Data collected by the pumps is coupled to the kiosk 19 and communicated over associated phone lines to remote locations that monitor usage and available fuel, coordinate re-filling and billing.

Depending upon the size of the tanks 4 and 6, the vault 2 can span the width (i.e. 24–30 feet) between two conventional fuel islands. Alternatively, the vault 2 might define a single island with opposite side drive up. In either instance, the cover 14 is sized to support the load bearing weight. The cover thickness can vary in a range of 6 to 10 inches, depending whether vehicles and/or traffic moves over the cover 14.

A limitation of the practical size of the vault 2 is the weight and ability to transport the base 12, cover 14 and tanks 4 and 6 to a site. The components can be shipped separate for large vaults 2. The cover 14 may also be cast in place to the base 12 at the site. In this instance, a metal plate or support structure 5 (shown in dashed line) or a casting form assembly can be fit to the open edges of the base 12. Concrete can be cast in place over the plate 5. The plate 5 can be incorporated into the cover 14 with reinforcement members 28, attachment plates 31 or removed, if lifting hooks are provided.

The base 12 is typically sized to contain a volume of approximately 120% to 150% of the aggregate capacity of the primary tanks 4 and 6. Presently, the base 12 is sized to contain 125% of the storage capacity of the primary tanks 4 and 6. The vault 2 can be sized as desired but typically might contain aggregate volumes of 5,000 to 25,000 gallons. The secondary storage space 10 collects and contains leakage that occurs from a rupture of the primary tanks 4 and 6, condensation that collects on the tanks 4 and 6 or spillage that occurs when filling the tanks 4 and 6. Guttering or above-grade spill collection grates 21 can also be provided in or adjacent to the cover 14 and the pumps 8 to direct spillage from customer usage into an auxiliary container 23.

The tank 23 can be supported in the vault 2 or be displaced from the vault 2 at a suitable location. In either instance, necessary piping is provided in conventional fashion. The tank 23 is sized to achieve a desired auxiliary containment. The auxiliary tank 23 can also be coupled with appropriate conduits to the spill containment collars 18 and secondary space 10 to collect spills. Any spillage can thereby be reclaimed without undue effort.

Spillage, which results from over filling the tanks 4 and 6 or from expansion of contained fuel, is normally collected and contained by the tanks 4 and 6 in the secondary space 10. A pair of spill collar assemblies 18, which are discussed in more detail at FIGS. 2, 2A and 3, direct spillage to the space 10. Spill containment is possible due to the excess capacity provided by the base 12. The secondary space 10 is defined by coating the interior walls of the base 12 with a liquid sealant 25 and/or by mounting a liquid impermeable sheathing or membrane 27 between the tanks 4 and 6 and the base 12.

Figure 2:
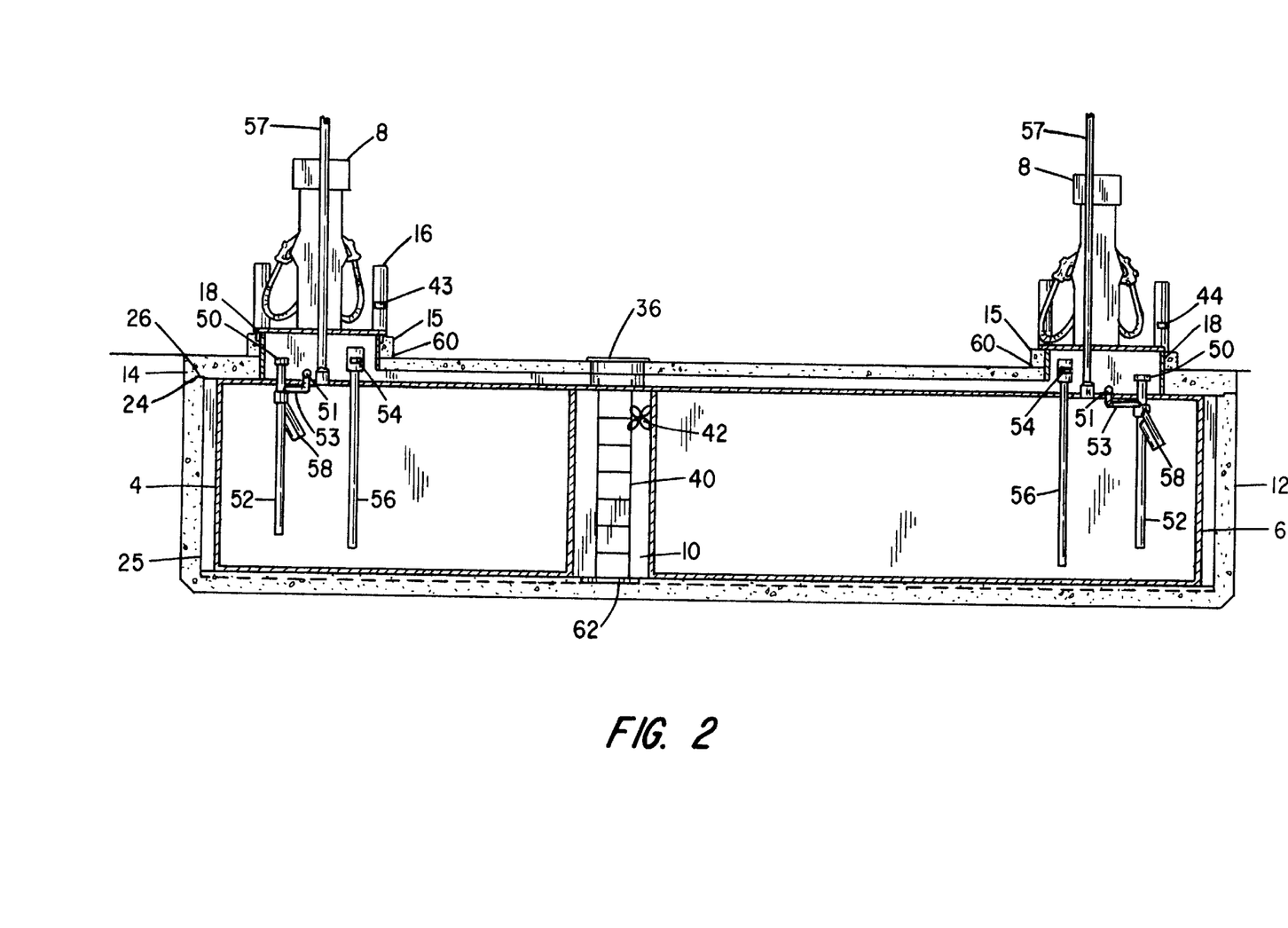
FIG. 2 is a longitudinal cross section view of FIG. 1.
Figure 2A:
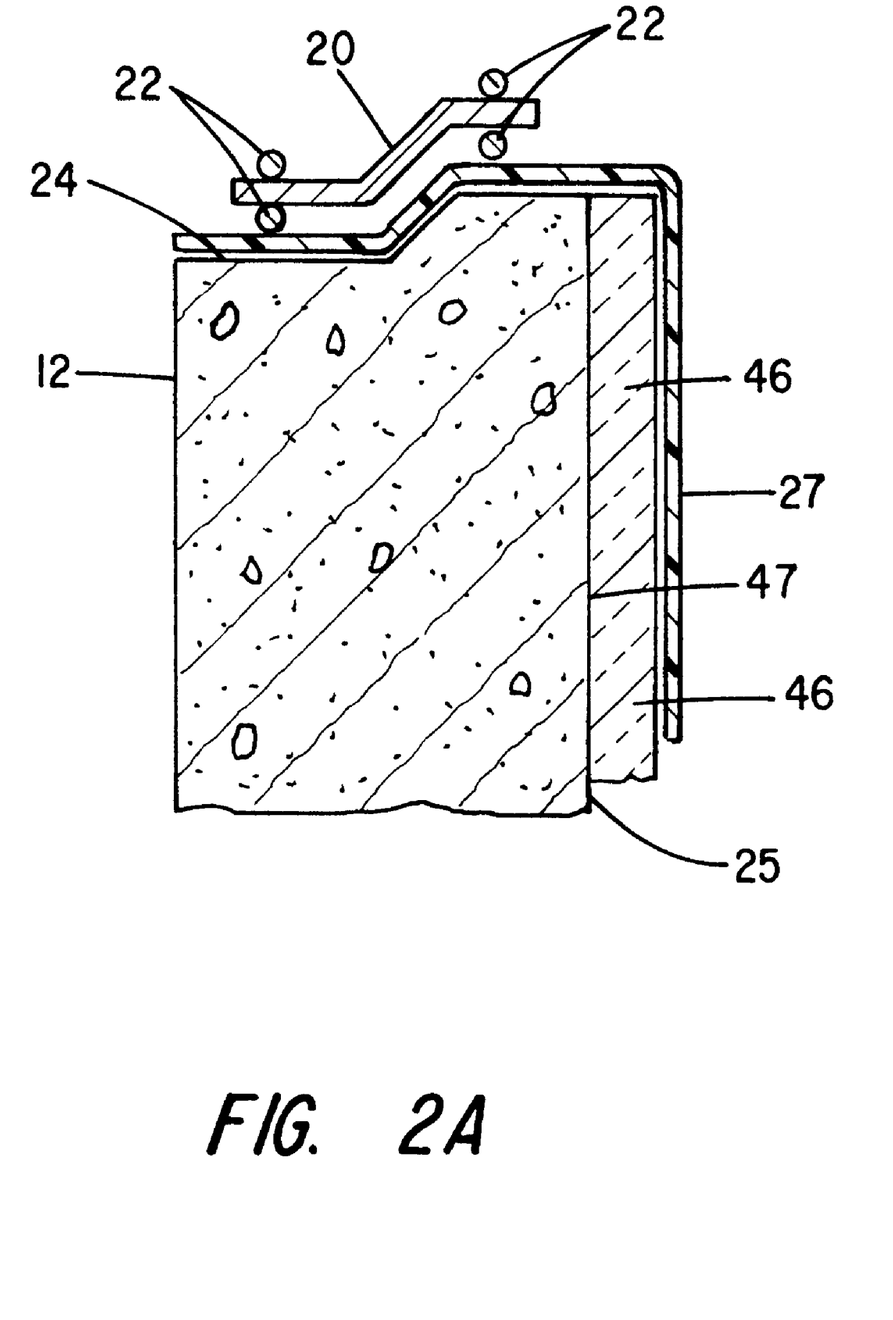
FIG. 2a is a detail drawing to the seam between the cover and base.

With attention to FIG. 2A, the cover 14 is sealed to the upper peripheral edge of the base 12 with a resilient, compressible, fire stop or barrier material 20. Beads of sealant 22 are applied to the barrier 20. Staggered, mating flanged surfaces 24 and 26 are formed into the base 12 and cover 14 to overlap and align with one another and interlock the cover 14 to the base 12. The integrity of the vault 2 is thereby preserved against lateral forces directed against the base 8 and cover 14, such as from frost and heaving at the fill earth. Strips of steel 29 can also be secured to the cover 14 and base 12 to further protect the seam between the cover 14 and base 12. A liquid and vapor tight seal is thereby obtained.

The interior surfaces of the vault 2 can be lined with a thermal insulator or liner 46. Sheets of foam can be used to this end. When used, the foam is bonded with a suitable adhesive to the concrete walls and floor of the base 12 and to the cover 14. The thermal, insulative barrier reduces potential moisture and condensation that can occur within the vault 2.

If a foam liner 46 is applied, a separate layer of a liquid impermeable sheathing 27 is normally mounted to cover the thermal barrier 46. The sheathing 27 is folded to closely fit to the foam liner 46, wrap over the upper edge 24 and mount beneath the fire stop 20. The sheathing 27 is bonded to the liner 46 with the adhesive sealant 22 (e.g. PENSIL 300). The interior walls of the base 12 can be separately coated with a commercially available sealant. The sheathing 27 defines a tertiary containment space 47 in the space between the sheathing 27 and walls of the base 12.

Cast into the walls of the base 12 and cover 14 in conventional fashion are reinforcement members 28, which typically comprise lengths of rebar, wire mesh or the like. The reinforcement members 28 at the cover 14 are sized and mounted to withstand the loading of the ground cover and/or vehicles being driven over the vault 2. Steel attachment plates 31 are welded to the tanks 4 and 6 and also depend from the cover 14. The plates 31 can be welded to the plate 5, if the cover is cast in place. The reinforcement members 28 are coupled to the plates 31, which are separately fastened to each other with appropriate fasteners at overlapping slip joints or apertures that align to each other. The attachment of the cover 14 to the tanks 4 and 6 can be effected before setting the cover 14 and tanks 4 and 6 into the base 12 and possibly after, depending upon the available internal inspection space. The fastening of the cover 14 to the tanks 4 and 6 further stabilizes the vault 2.

Disposed within the cover 14 are a number of runs of electrical conduit 30 and liquid conduits 34. Appropriate junction boxes or fixtures, such as the pumps 8 or spill collars 18, are provided at the terminations of the conduit 30 and/or pipes 34. For example, the conduits 30 and pipes 34 normally contain control wiring and power conductors. Some may direct spillage and overflow between the tanks 4 and 6 and to the secondary storage space 10.

Mounted in the cover 14 between the tanks 4 and 6 is a manhole or access port 36. A suitably locked steel cover 38 is mounted to prevent unauthorized access by vandals. A ladder 40, see also FIG. 2, is positioned below the port 36. The tanks 4 and 6 are mounted to permit entry to the secondary space 10 by maintenance personnel to inspect the interior of the base 12 for damage and the presence of condensation, leakage or spillage. A ventilation fan 42 mounted in the space 10 cooperates with air intake ports 43 and exhaust ports 44. The ports 43 and 44 can be fitted to the stanchions 16 or in other locations about the cover 14.

Referring to FIG. 2 and positioned beneath each pump 8 is a spill collar 18. Each collar 18 can be constructed as a metal assembly or can be cast into the cover 14. The collars 18 define a collection space around the fill and/or vent ports and contain possible spillage that might occur during the filling of the tanks 4 and 6 or from back pressure through a tank vent. Spillage from filling can occur under either a "loose fill" or "tight fill" condition. A "loose fill" condition exists where a fill nozzle is loosely supported (i.e. not threaded) to the collar 50 of a fill pipe 52. If liquid collects in the collar 18, it is directed by a screened drain head 51 and pipe 53 back into the pipe 52. If a larger volume spill occurs, the spill is also directed by a screen covered collar 54 of a vent pipe 56 into the tank 4 or 6. Separate vent pipe risers 57 extend above the pumps 8.

A "tight fill" condition exits where the fill nozzle is threaded to the collar 50 and fill pipe 52 and the fuel backs up through the vent collar 54 and vent pipe 56 to collect in the spill collar 18. In this instance, the spill is directed by the drain 51 back into the tank. Separate piping (not shown) may also be directed from each spill collar 18 to the auxiliary tank 23 in the event the capacity of the collar 18 is exceeded. The collars 18 might accommodate 5 to 25 gallons.

A check valve 58 is separately fitted to the fill pipes 52 to prevent back flow from the tanks 4 and 6 through the fill pipe 52. The check valve 58 may or may not be included as required by a particular application. Access to the fill collars 54 is obtained through covers at the mounting plate 60 aligned to each spill collar 18 and pump 8.

Figure 3:
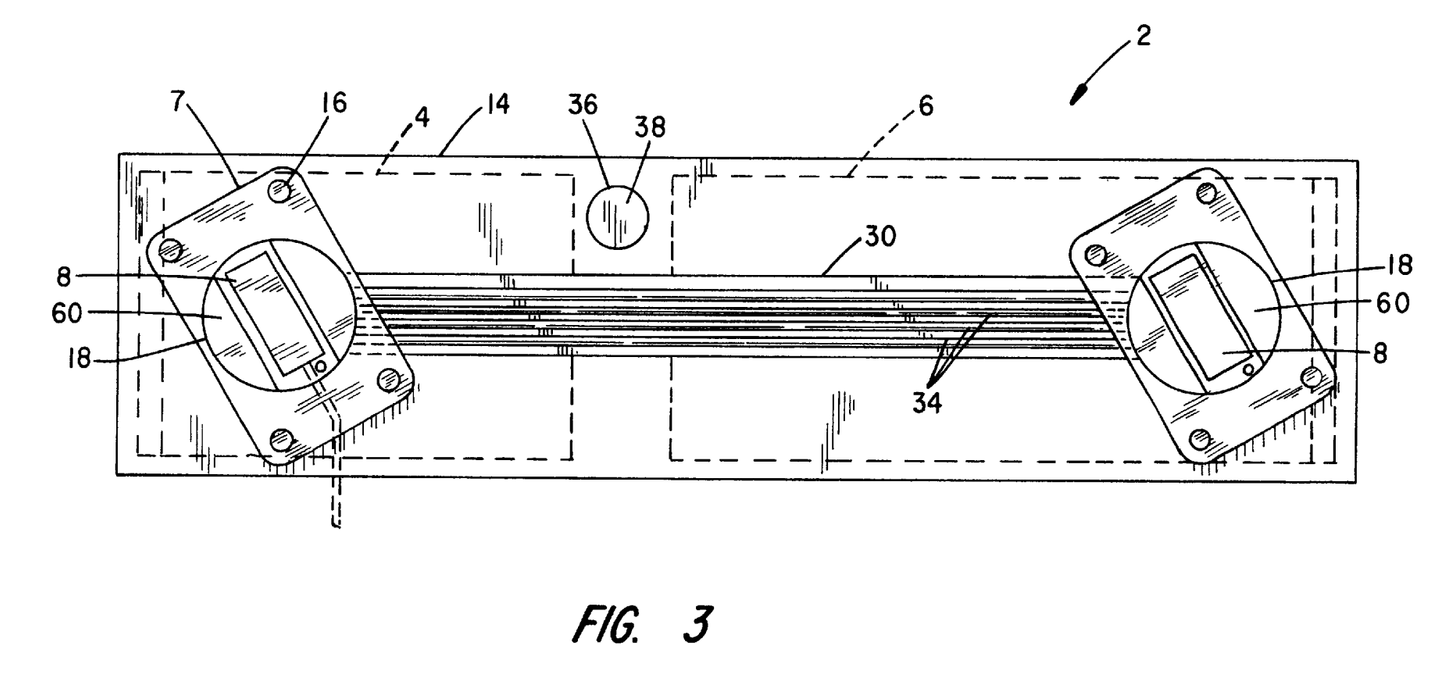
FIG. 3 is a top plan view of the tank cover and dispenser mounting plate.

The orientation of the pumps 8 to the cover can be varied as desired. FIG. 3 depicts a rotated mounting arrangement of the mounting plates 60 that support the concrete support pads 15 and pumps 8.

Also associated with the vault 2 is various leak and spill monitoring equipment. The monitoring equipment is fitted to appropriate standpipes to monitor liquid in the secondary and tertiary spaces 10 and 47. A variety of conventional monitoring assemblies from dipsticks to electronic transducers can be adapted to monitor internal liquid levels. The vault 2 can also be visually inspected via the manhole 36.

A grate covered sump region 62 is also formed in the bottom of the base 12 to collect leakage and spillage. The bottom wall of the base 12 is sloped and/or includes recessed channels (shown in dashed line) to direct the liquid to the low point of the sump 62. A conventional siphon or pump assembly may be fitted in conventional fashion to extract liquids that collect in the spaces 10, 47 and 62.

Figure 4:
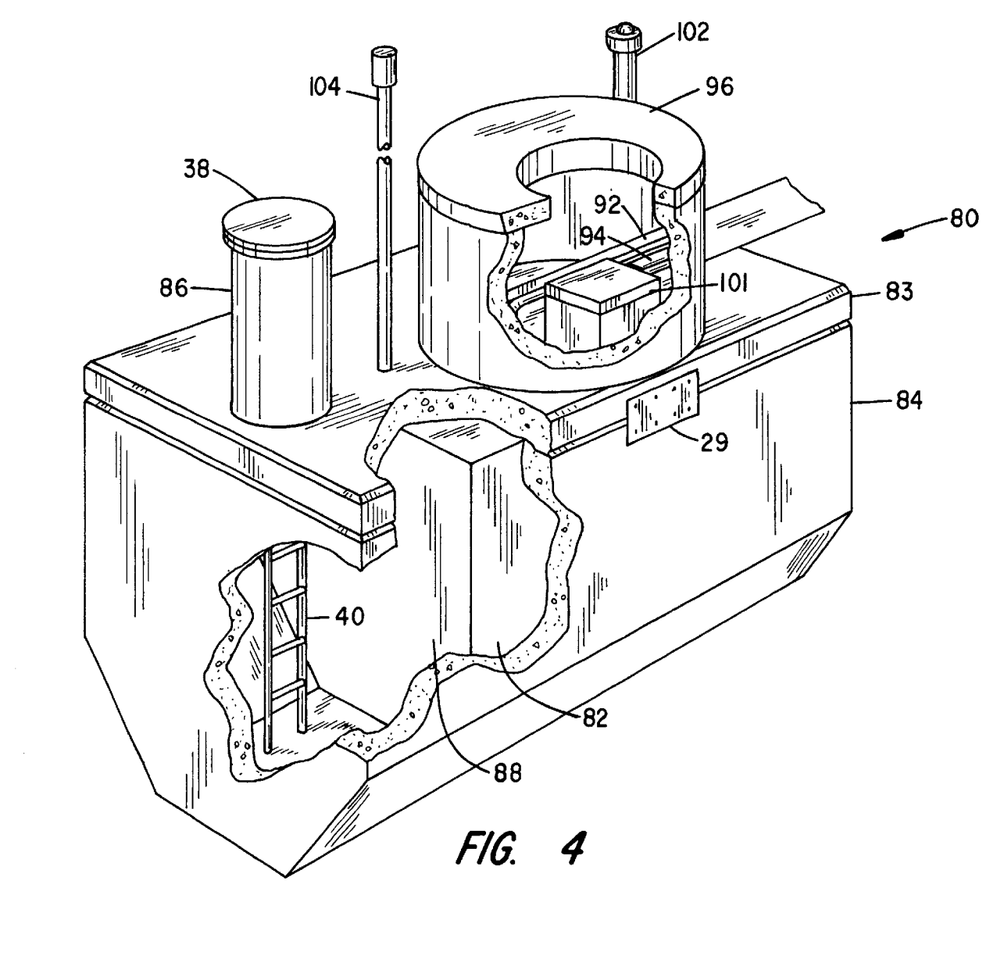
FIG. 4 is a perspective drawing to a ventilated vault which supports a single tank and dispenser.
Figure 5:
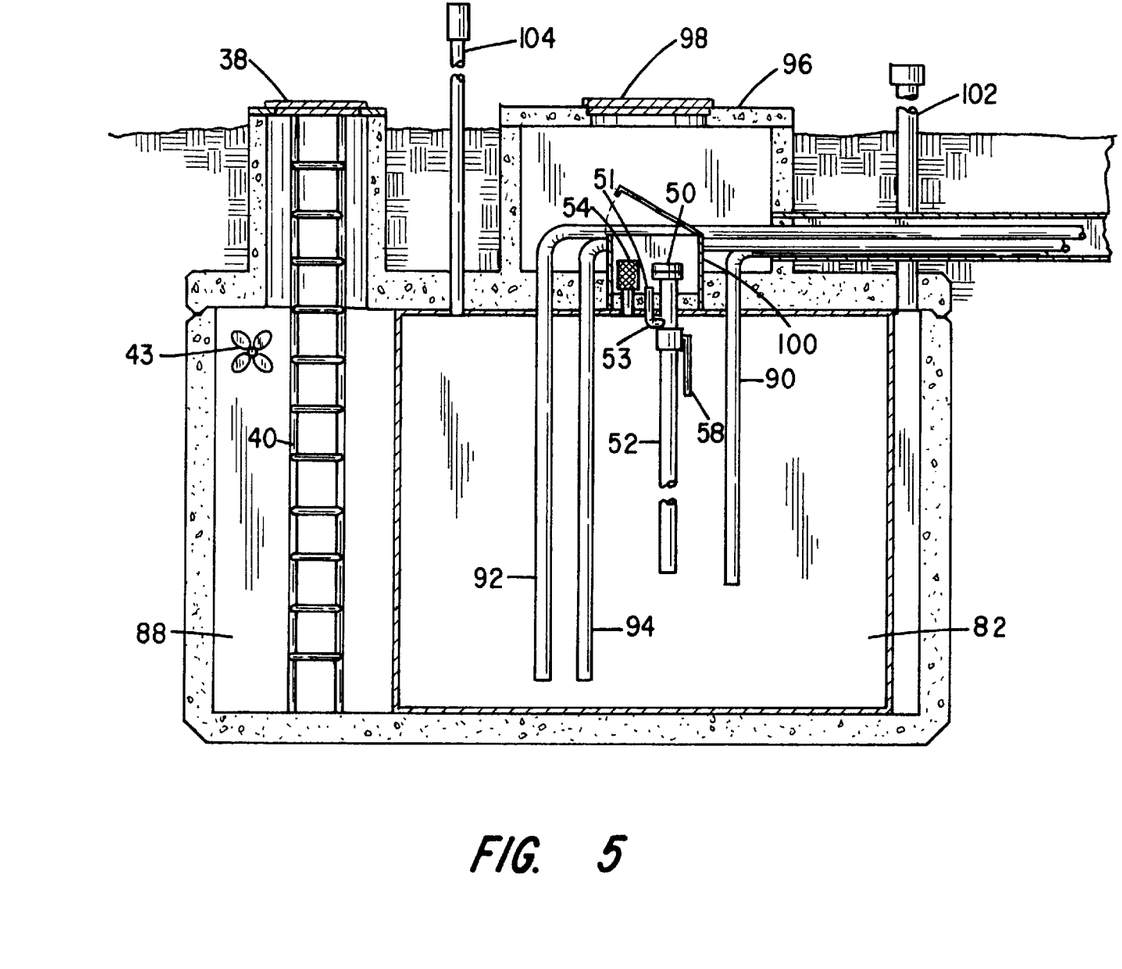
FIG. 5 is a longitudinal cross section view of FIG. 4.

FIGS. 4 and 5 depict alternative perspective and cross section views to a vault 80 that contains a single storage tank 82. The tank 82 can be sized to contain 5,000 to 10,000 gallons. The vault 80 provides a cover 83 and base 84 which are sealed to one another in the fashion of FIG. 2a. The vault 80 may include an insulative liner 46 and impermeable sheathing 27, as desired. A manhole access way 86 extends into a secondary space 88 in the base 84 and is accessed via an associated cover 38. A ladder 40 facilitates internal vault inspection. A fan 43 ventilates the space 88.

Various dispensing pipes 90 and 92 mount through a concrete hatch 96 and are accessible by via a cover 98. Separately mounted in the collar 96 is a spill containment collar 100, which has a cover 101, and fill, vent and drain collars 50, 51 and 54. An overflow pipe 94 also extends from the collar 100 back to the tank 82.

A vent pipe 102 projects from the vault 80. A separate vent pipe 104 extends from the tank 82. The vault 80 can be used in various fuel depot situations, for example, cartage yards, resorts or industrial sites having low volume requirements. A single blend of fuel is typically required for these situations. A below-grade mount prevents ground contamination and removes the tank from exposure to above-grade hazards. The pump 8 can be remotely mounted from the vault 80 or the pump 8 and various of the control equipment and accessories discussed with respect to the vault 2 may be incorporated into the vault 80.

Figure 6:
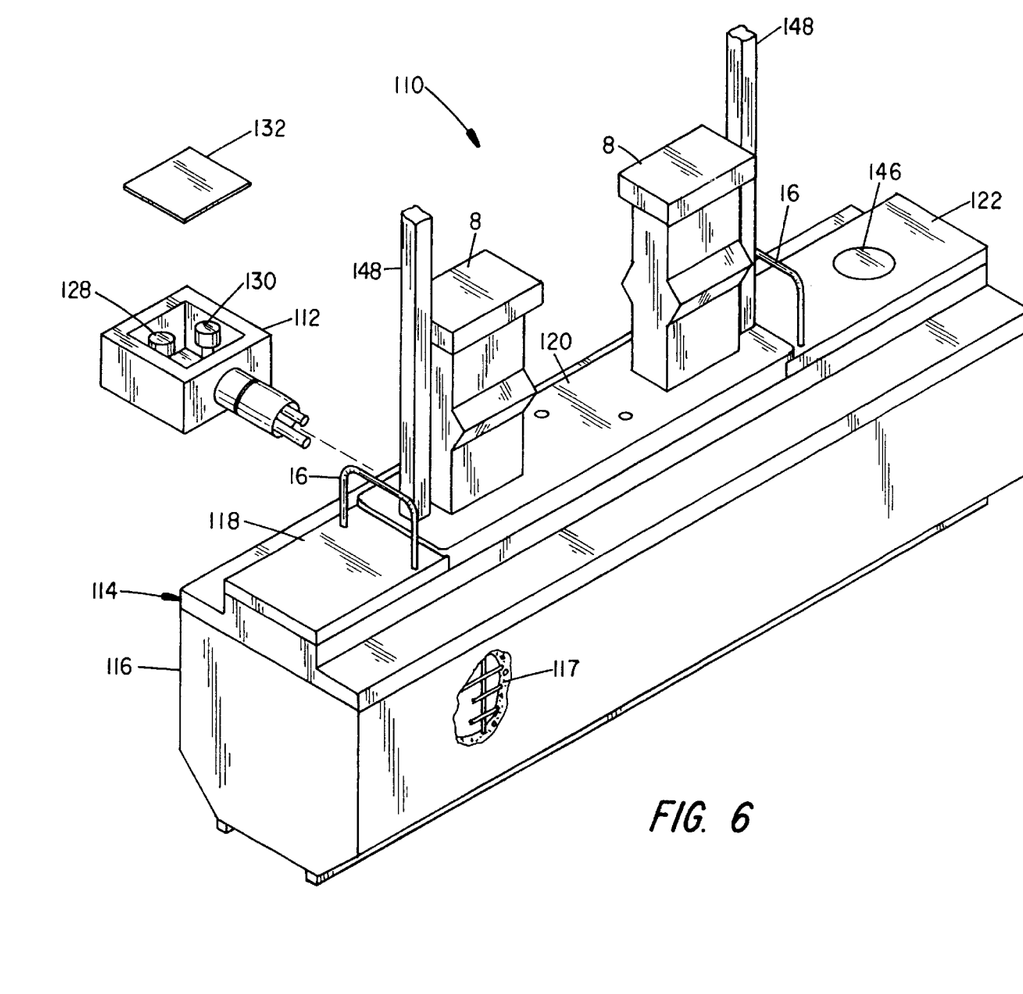
FIG. 6 is an isometric drawing of a vault with an equipment and conduit chase and several covers supported to the chase containing two pump dispensers and canopy columns.

FIG. 6 depicts another modular vault assembly 110 that facilitates installation and repair of the vault assembly 110. The assembly 110 can be installed in a matter of 2 to 3 days with relatively little site preparation. The assembly 110, like the above-described vault assemblies 2 and 80, can be mounted directly beneath the dispensers 8, thereby doing away with a disparate tank field. Potentially troublesome piping runs are thus avoided. The vaults can be filled locally or a remote fill station can be provided via a remote fill base 112 that is discussed in more detail below.

Figure 7:
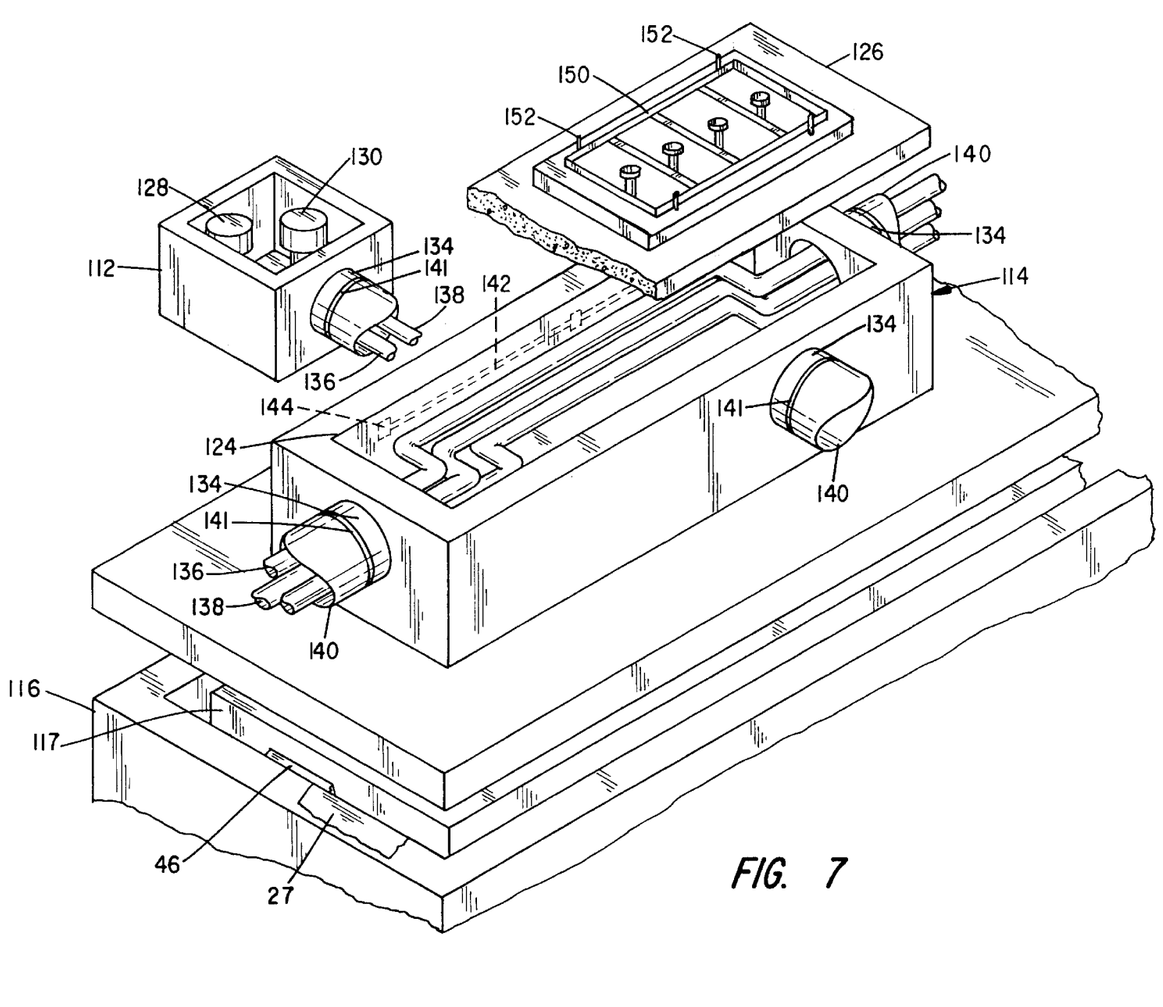
FIG. 7 is a detailed isometric drawing of the equipment and conduit chase with a pan and chase cover shown in exploded assembly.

The assembly 110 in lieu of a single cover includes a cast concrete piping/conduit and equipment chase or collar 114 that mounts to a vault base 116 and which contains a storage tank 117 of appropriate size and construction (e.g. a 14,000 gallon steel tank). The base 16 is constructed in comparable fashion to the base 12 to provide secondary and tertiary containment of spilled or leaked liquids. Suitable resin coatings, impermeable membranes and/or insulation can be secured to the interior sidewalls. A number of covers or lids 118, 120 and 122 separately mount over a full-length opening 124 and seal the chase 114 and base 116. FIG. 7 shows an isometric view to the chase 114 in exploded assembly and in relation to a dispenser cover section 126 that supports a dispensing pump 8 and a remote fill base 112.

The remote fill base 112 contains a vent cap 128 and a fill bucket 130 which are covered with a removable plate 132. A conventional fill collar (not shown) with spill recovery accessories is contained in the fill bucket 130. The interior of the fill base 112 is coated with protective resins. An elastomer seal 134 is cast into and/or fastened to the sidewall of the base 112 and tough which suitable vapor and liquid conduits 136 and 138 extend. The conduits 136 and 138 are contained in a suitable length of reinforced pipe or leakage containment conduit 140 that is separately fitted to the seal 134. Compression bands 141 or other suitable fasteners secure the seal 134 in liquid tight relation to the conduit 140.

The conduits 136, 138 and 140 are routed to an identical seal 134 at the chase 114. The conduits 136 and 138 are then coupled to appropriate piping or equipment fitted to the storage tank 117. Any spillage or leakage is contained to the fill base 112 and conduit 140 and directed via the conduit 140 to the recovery space in the base 116.

The chase 114 mounts directly to the base 116 and is sealed in the same fashion as the cover 14. For a 14,000-gallon tank 117, the chase 114 extends approximately 38 feet.

The chase 114 facilitates access to necessary electrical, vapor and liquid attachments to the tank 117. The full-length opening 124 is elevated approximately 30 inches above the base 116, which prevents seepage of rain and other surface moisture into the base 116. The chase 114 accommodates full or partial access to all support devices fitted to the vault assembly 110. Several runs of vapor and liquid handling piping 136 and 138 are pre-mounted to the interior walls of the chase 114 along with one or more seals 134 to accommodate longitudinal or lateral access. Electrical conduits 142 and junction boxes 144 are separately cast into the walls of the chase 114 to contain supply and control wiring. Installation and maintenance personnel thus have ready access to the vault 110 via the chase 114.

The opening 124 is covered with several lids of suitable length. The lids can be solid (i.e. lid 118), contain an access plate 146 (i.e. lid 122) and can support safety stanchions 16 and/or anchor canopy columns 148 (i.e. lid 120) that support an island canopy (not shown). The lid 126 further depicts a raised, liquid impermeable pan 150 that is cast into the lid 126 and over which a dispenser 8 is mounted. Liquid-tight seals mounted to the bottom of the pan 150 seal around any pipes that protrude through the pan 150. Lag bolts 152 secure the associated dispenser 8 to the lid 26.

Figure 8:
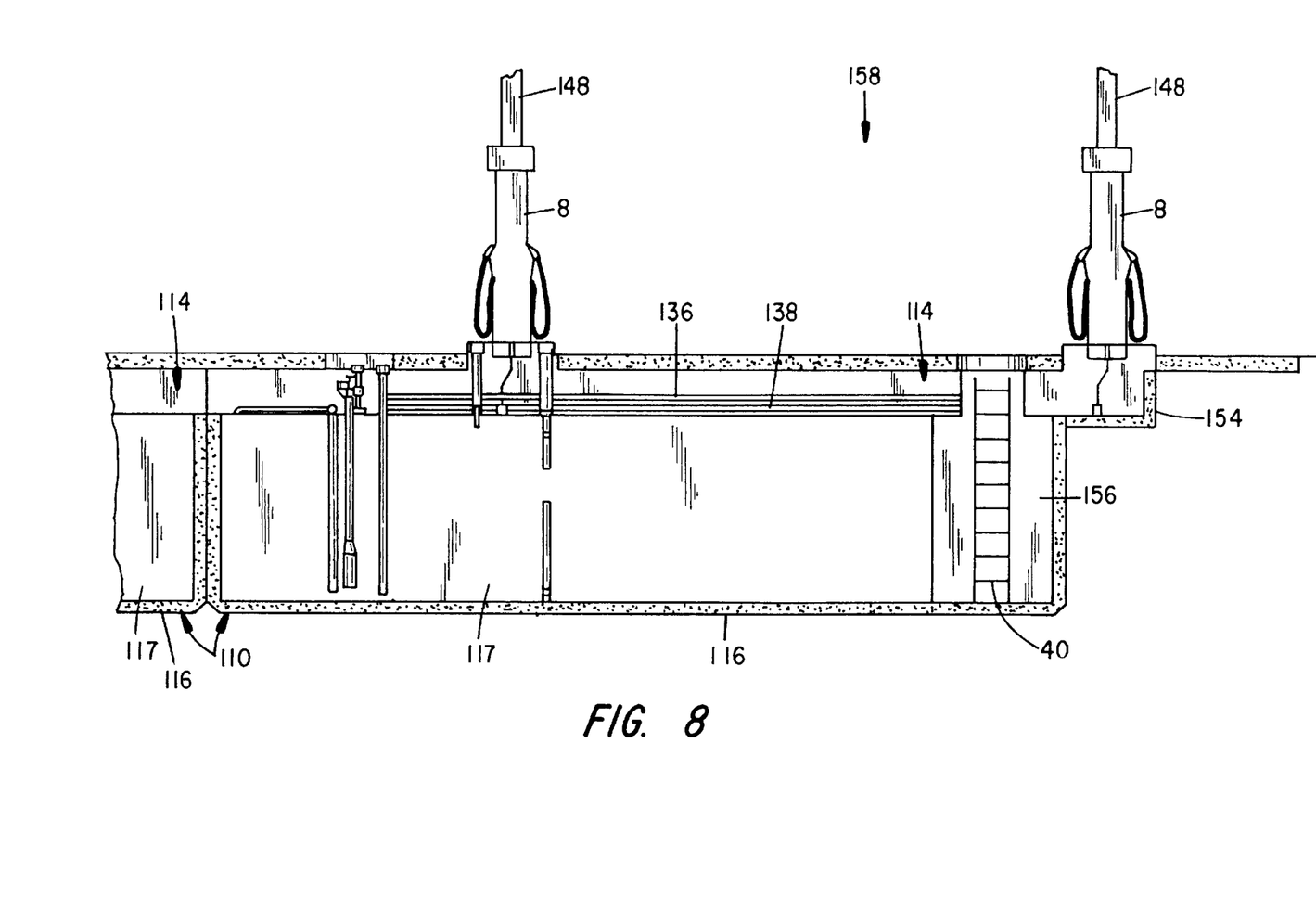
FIG. 8 is a longitudinal elevation view of a multi-vault island layout shown in cross section.

FIG. 8 depicts an elevation view through a vault assembly 158 and which provides two vaults 110 mounted in end-to-end fashion. Each vault includes a chase 114 and suitable chase lids. The chases 114 are coupled via the end seals 134 and conduits 140 that extend between the seals. The rightmost dispenser 8 is mounted to a cast concrete wing box 154 that is coupled to its neighboring chase via an end seal 134. A space 156 that is accessible via a manhole is also provided for inspection and maintenance purposes.

While the invention has been described with respect to a presently preferred construction and various considered modifications and improvements thereto, still other constructions may be suggested to those skilled in the art. Although several features are also described with respect to particular arrangements, it is to be appreciated the features can be combined in any variety of combinations at the disclosed modularly configured vault assemblies. The vaults may also be mounted directly beneath associated dispensers or they can be remotely mounted from the dispensers. The invention should therefore be broadly construed within the spirit and scope of the appended claims.

What is claimed is:

1. Liquid containment apparatus comprising:
   (a) a base having a plurality of sidewalls that project from a bottom wall to define an open cavity;
   (b) tank means mounted within said open cavity for containing a liquid;
   (c) means for defining secondary storage space between said tank means and the side and bottom walls of said base;
   (d) an annular chase having raised sidewalls that border a through aperture that extends substantially the full length of said open cavity and that mounts to the sidewalls of said base, wherein said chase includes a plurality of pre-mounted conduits that couple to said tank means and wherein said chase includes an aperture through a sidewall and an elastomer seal cast into said sidewall and a fastener for securing said seal to a conduit having a bore aligned the aperture at the chase sidewall; and
   (e) a plurality of cover that mount to said chase sidewalls to cover said open cavity.

2. Containment apparatus as set forth in claim 1 wherein said chase includes a conduit cast into the walls thereof and having an access port to said conduit.

3. Containment apparatus as set forth in claim 1 including an open topped fill enclosure having an aperture through a sidewall and an elastomer seal cast into said sidewall, a first conduit secured to said seal, a fill port coupled to a second conduit, a vent port coupled to third conduit, and wherein said second and third conduits extend through said first conduit and said first conduit terminates at said seal at the aperture through the chase sidewall and said second and third conduits couple to said tank means.

4. Containment apparatus as set forth in claim 1 wherein said base includes a continuous sheet liquid impermeable membrane mounted between said tank means and said sidewalls, which membrane defines said secondary storage space and terminates at a peripheral edge of said sidewalls to contain spilled liquid in said secondary storage space.

5. Containment apparatus as set forth in claim 4 wherein the walls of said base beneath said impermeable membrane are lined with a thermal insulation, wherein the walls of said base are coated with a liquid impermeable material, and wherein the space between said membrane and coated walls of said base define a tertiary storage space.

6. Containment apparatus as set forth in claim 1 including a liquid dispenser mounted to one of said plurality of covers and coupled to said tank means and a plurality of rigid stanchions that surround said dispenser.

7. Containment apparatus as set forth in claim 6 including control means coupled to said liquid dispenser for collecting and communicating data pertaining to pumped liquids.

8. Containment apparatus as set forth in claim 6 wherein said cover includes a liquid impermeable an having a bottom that mounts beneath said dispenser and that contains a plurality of seals fitted to pipes that extend through the pan bottom.

9. Containment apparatus as set forth in claim 1 including sump means for directing liquid collecting in the base to a low point.

10. Containment apparatus as set forth in claim 1 including means for ventilating the secondary storage space.

11. Liquid containment apparatus comprising:
   (a) a base having a plurality of sidewalls that project from a bottom wall to define an open cavity;
   (b) tank means mount d within said open cavity for containing a liquid;
   (c) means for defining a secondary storage space between said tank means and the side and bottom walls of said base;
   (d) an annular chase having raised sidewalls that border a through aperture that extends substantially the full length of said open cavity and that mounts to the sidewalls of said base, wherein said chase includes a plurality of pre-mounted conduits that couple to said tank means, wherein said chase includes a conduit cast into the walls thereof and having an access port to said conduit, wherein said chase includes an aperture through a sidewall and a leakage containment conduit having a bore aligned to the aperture and sealed to the chase sidewall an wherein a conduit that couples to one of said plurality of pre-mounted conduits extends through said leakage containment conduit; and (e) a plurality of cover that mount to said chase sidewalls to cover said open cavity and wherein one of said plurality of covers includes a liquid impermeable pan having a bottom and that contains a plurality of seals fitted to pipes that extend through the pan bottom.

12. Containment apparatus as set forth in claim 11 including an open topped fill enclosure having an aperture through a sidewall and an elastomer seal cast into said sidewall, a first conduit secured to said seal, a fill port coupled to a second conduit, a vent port coupled to a third conduit, and wherein said second and third conduits extended through said first conduit and said first conduit terminates at said seal at the a aperture through the chase sidewall and said second and third conduits couple to said pre-mounted conduits.

13. A Liquid containment apparatus comprising:

(a) a base having a plurality of sidewalls that project from a bottom wall to define an open cavity;

(b) tank means mounted within said open cavity for containing a liquid;

(c) a continuous sheet liquid impermeable membrane mounted between said tank means and said sidewalls, which membrane defines a secondary storage space and terminates at a peripheral edge of said sidewalls to contain spilled liquid in said secondary storage space;

(d) an annular chase having raised sidewalls that border a through aperture that extends substantially the full length of said open cavity and that mounts to the sidewalls of said base and wherein said chase includes a plurality of pre-mounted conduits that couple to said tank means;

(e) means mounted in liquid tight relation to said chase sidewalls and communicating with said secondary storage space for containing conduits penetrating the chase sidewalls and leakage from said conduits; and (f) a plurality of covers that mount to said chase sidewalls to cover said open cavity.

14. Containment apparatus as set forth in claim 13 wherein said chase includes an aperture through a sidewall and an elastomer seal cast into said sidewall and a fastener for securing said seal to a conduit containing the chase sidewall penetrating conduits.

15. Containment apparatus as set forth in claim 13 including an open topped fill enclosure having an aperture through a sidewall and an elastomer seal cast into said sidewall, a first conduit secured to said seal, a fill port coupled to a second conduit, a vent port coupled to a third conduit, and wherein said second and third conduits extend through said first conduit and said first conduit terminates at a seal at an aperture through the chase sidewall and said second and third conduits couple to said pre-mounted conduits and said tank means.

16. Liquid containment apparatus comprising:

(a) a base having a plurality of sidewalls that project from a bottom wall to define an open cavity;

(b) tank means mounted within said open cavity for containing a liquid;

(c) means for defining a secondary storage space between said tank means and the side and bottom walls of said base;

(d) an annular chase having raised sidewalls that border a through aperture that extends substantially the full length of said open cavity and that mounts to the sidewalls of said bases, wherein said chase includes a plurality of pre-mounted conduits that couple to said tank means, and a conduit mounted in liquid tight relation to the chase sidewalls and communicating with said secondary storage space for containing conduits penetrating the chase sidewalls and coupling to said pre-mounted conduits and directing leakage from said conduits;

(e) a plurality of covers that mount to the chase sidewalls to cover said open cavity; and (f) a liquid dispenser mounted to one of said plurality of covers and coupled to said tank means.

17. Containment apparatus as set forth in claim 16 including control means coupled to said liquid dispense for collecting and communicating data pertaining to pumped liquids.

18. Containment apparatus as set forth in claim 16 wherein said chase includes an aperture through a sidewall and an elastomer seal cast into said sidewall and a fastener for securing said seal to a conduit containing conduits penetrating the chase sidewall and coupling to said re-mounted conduits.

19. Containment apparatus as set forth in claim 18 including an open topped fill enclosure having aperture through a sidewall and an elastomer seal cast into said sidewall, a first conduit secured to said seal, a fill port coupled to a second conduit, a vent port coupled to a third conduit, and wherein said second and third conduits extend through said first conduit and said first conduit terminates at said seal at the aperture through the chase sidewall and said second and third conduits couple to said tank means.

20. Liquid containment apparatus comprising:

(a) a base having a plurality of sidewalls that project from a bottom wall to define an open cavity;

(b) tank means mounted within said open cavity for containing a liquid;

(c) means for defining secondary storage space between said tank means and the side and bottom walls of said base;

(d) an annular chase having raised sidewalls that border a through aperture that extends substantially the full length of said open cavity and that mounts to the sidewalls of said bases wherein said chase includes a plurality of pre-mounted conduits that couple to said tank means;

(e) means mounted in liquid tight relation to said chase sidewalls and communicating with said secondary storage space for containing conduits penetrating the chase sidewalls and coupling to said pre-mounted conduits and directing leakage from said conduits and leakage from said conduits; and (f) a plurality of cover that mount to said chase sidewalls to cover said open cavity.

* * * * *

UNITED STATES PATENT AND TRADEMARK OFFICE
CERTIFICATE OF CORRECTION

PATENT NO. : 6,637,976 B2
DATED : October 28, 2003
INVENTOR(S) : Kelly Stanton

It is certified that error appears in the above-identified patent and that said Letters Patent is hereby corrected as shown below:

Column 9,
Line 60, after "defining" insert -- a --

Column 10,
Line 5, after "aligned" insert -- to --
Line 7, "cover" should read -- covers --
Line 41, "an" should read -- pan --
Line 53, "mount d" should read -- mounted --

Column 11,
Line 2, "an" should read -- and --
Line 5, "cover" should read -- covers --
Line 15, "extended" should read -- extend --
Line 17, "at the a aperture" should read -- at the aperture --

Column 12,
Line 7, "bases" should read -- base --
Line 20, "dispense" should read -- dispenser --
Line 28, "re-mounted" should read -- pre-mounted --
Line 30, after "having" insert -- an --
Line 49, "bases" should read -- base --
Line 58, "cover" should read -- covers --

Signed and Sealed this

Twentieth Day of January, 2004

JON W. DUDAS
*Acting Director of the United States Patent and Trademark Office*